(12) United States Patent
Clark, II et al.

(10) Patent No.: US 10,277,619 B1
(45) Date of Patent: Apr. 30, 2019

(54) SYSTEM AND METHODS OF IDENTIFYING SYSTEM VULNERABILITIES

(71) Applicant: Nationwide Mutual Insurance Company, Columbus, OH (US)

(72) Inventors: David B. Clark, II, Grove City, OH (US); Kevin J. Sullivan, Columbus, OH (US); Jane L M Kuberski, Pickerington, OH (US); Paul J. Melko, Jr., Westerville, OH (US); Narayanasamy Balakrishnan, Gahanna, OH (US); Koen Klaas Kuiken, Whitehall, OH (US); Travis Ray Lenocker, Delaware, OH (US); Zachary J. Eyen, Columbus, OH (US); Shad Cummins, Powell, OH (US); Daniel W. David, Hilliard, OH (US)

(73) Assignee: Nationwide Mutual Insurance Company, Columbus, OH (US)

(*) Notice: Subject to any disclaimer, the term of this patent is extended or adjusted under 35 U.S.C. 154(b) by 128 days.

(21) Appl. No.: 15/139,638

(22) Filed: Apr. 27, 2016

Related U.S. Application Data

(60) Provisional application No. 62/245,373, filed on Oct. 23, 2015.

(51) Int. Cl.
  *H04L 29/06* (2006.01)
  *G06F 21/57* (2013.01)
(52) U.S. Cl.
  CPC ........ *H04L 63/1433* (2013.01); *G06F 21/577* (2013.01)

(58) Field of Classification Search
  CPC .......................... G06F 21/577; H04L 63/1433
  See application file for complete search history.

(56) References Cited

U.S. PATENT DOCUMENTS

| | | | |
|---|---|---|---|
| 6,925,443 B1* | 8/2005 | Baggett, Jr. ........... | G06F 21/577 705/1.1 |
| 2004/0015728 A1* | 1/2004 | Cole .................... | G02B 5/3083 726/23 |

(Continued)

*Primary Examiner* — Christopher C Harris
(74) *Attorney, Agent, or Firm* — Morgan Lewis & Bockius LLP

(57) ABSTRACT

The invention relates to detecting vulnerabilities in technology infrastructure environments. Data describing vulnerabilities detected in a technological environment of an enterprise is obtained. The vulnerability data is combined with data relating to servers, applications associated with the servers, and business functions associated with the applications, within the technological environment of the enterprise in order to create enriched data. The enriched data is enhanced using one or more of the following processes: deduplicating records in the enriched data; modifying of a severity assigned to vulnerabilities based on one or more enterprise-infrastructure factors; archiving and purging of records included in the enriched data; consolidating IP addresses associated with the vulnerabilities; excepting records in the enriched data for vulnerabilities undergoing active remediation; and validating the enriched data. After the enriched data is enhanced, it may be sorted in accordance with one or more filters. The sorted data may then be displayed for further analysis.

12 Claims, 3 Drawing Sheets

(56) References Cited

U.S. PATENT DOCUMENTS

| | | | | |
|---|---|---|---|---|
| 2007/0067846 A1* | 3/2007 | McFarlane | G06F 21/577 | 726/25 |
| 2008/0092237 A1* | 4/2008 | Yoon | G06F 21/577 | 726/25 |
| 2011/0231935 A1* | 9/2011 | Gula | H04L 43/028 | 726/25 |
| 2012/0144493 A1* | 6/2012 | Cole | G02B 5/3083 | 726/25 |
| 2012/0304300 A1* | 11/2012 | LaBumbard | G06F 21/577 | 726/25 |
| 2013/0247207 A1* | 9/2013 | Hugard, IV | G06F 21/577 | 726/25 |
| 2014/0047545 A1* | 2/2014 | Sidagni | G06F 21/577 | 726/25 |
| 2015/0150072 A1* | 5/2015 | Doctor | H04L 63/20 | 726/1 |
| 2015/0379273 A1* | 12/2015 | Chess | G06F 21/577 | 726/25 |
| 2016/0232358 A1* | 8/2016 | Grieco | G06F 21/577 | |
| 2016/0300065 A1* | 10/2016 | Bang | G06F 21/577 | |
| 2017/0214711 A1* | 7/2017 | Arnell | H04L 63/1433 | |

* cited by examiner

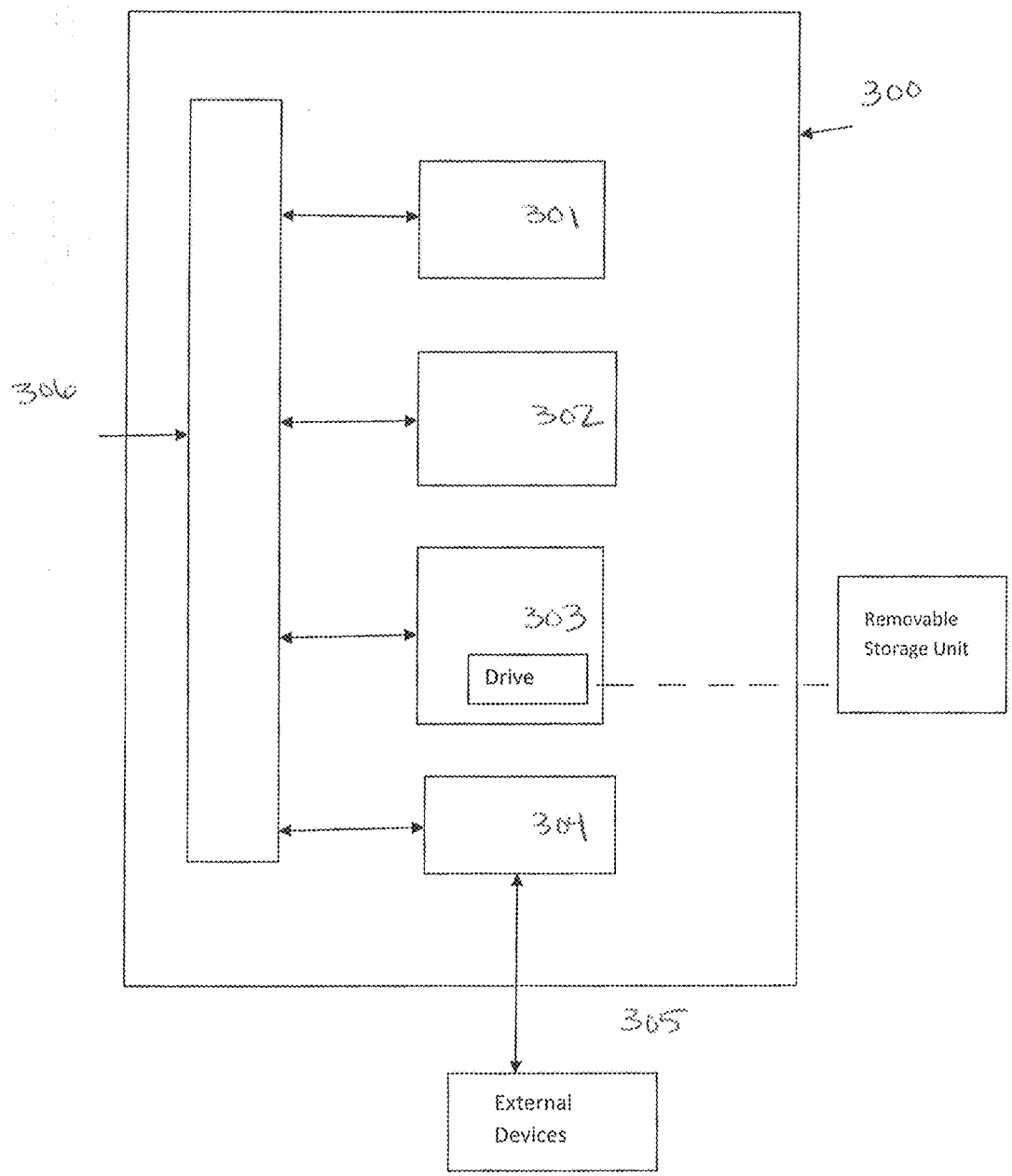

SYSTEM AND METHODS OF IDENTIFYING SYSTEM VULNERABILITIES

CROSS REFERENCE TO RELATED APPLICATIONS

The application claims priority to U.S. Provisional Patent Application No. 62/245,373, filed Oct. 23, 2015, which is hereby incorporated by reference in its entirety.

FIELD OF THE INVENTION

The invention relates to detecting vulnerabilities in technology infrastructure environments.

BRIEF SUMMARY OF THE INVENTION

In accordance with embodiments of the present invention, data describing vulnerabilities detected in a technological environment of an enterprise is obtained. The vulnerability data is combined with data relating to servers, applications associated with the servers, and business functions associated with the applications, within the technological environment of the enterprise, in order to create enriched data. The enriched data is enhanced using one or more of the following processes: deduplicating records in the enriched data; modifying of a severity assigned to vulnerabilities based on one or more enterprise-infrastructure factors; archiving and purging of records included in the enriched data; consolidating IP addresses associated with the vulnerabilities; excepting records in the enriched data for vulnerabilities undergoing active remediation; and validating the enriched data. After the enriched data is enhanced, it may be sorted in accordance with one or more filters. The sorted data may then be displayed for further analysis.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIG. 3 illustrates an exemplary computer system that may be used in connection with implementing the present invention.

DETAILED DESCRIPTION OF THE PREFERRED EMBODIMENTS

Figure 1:
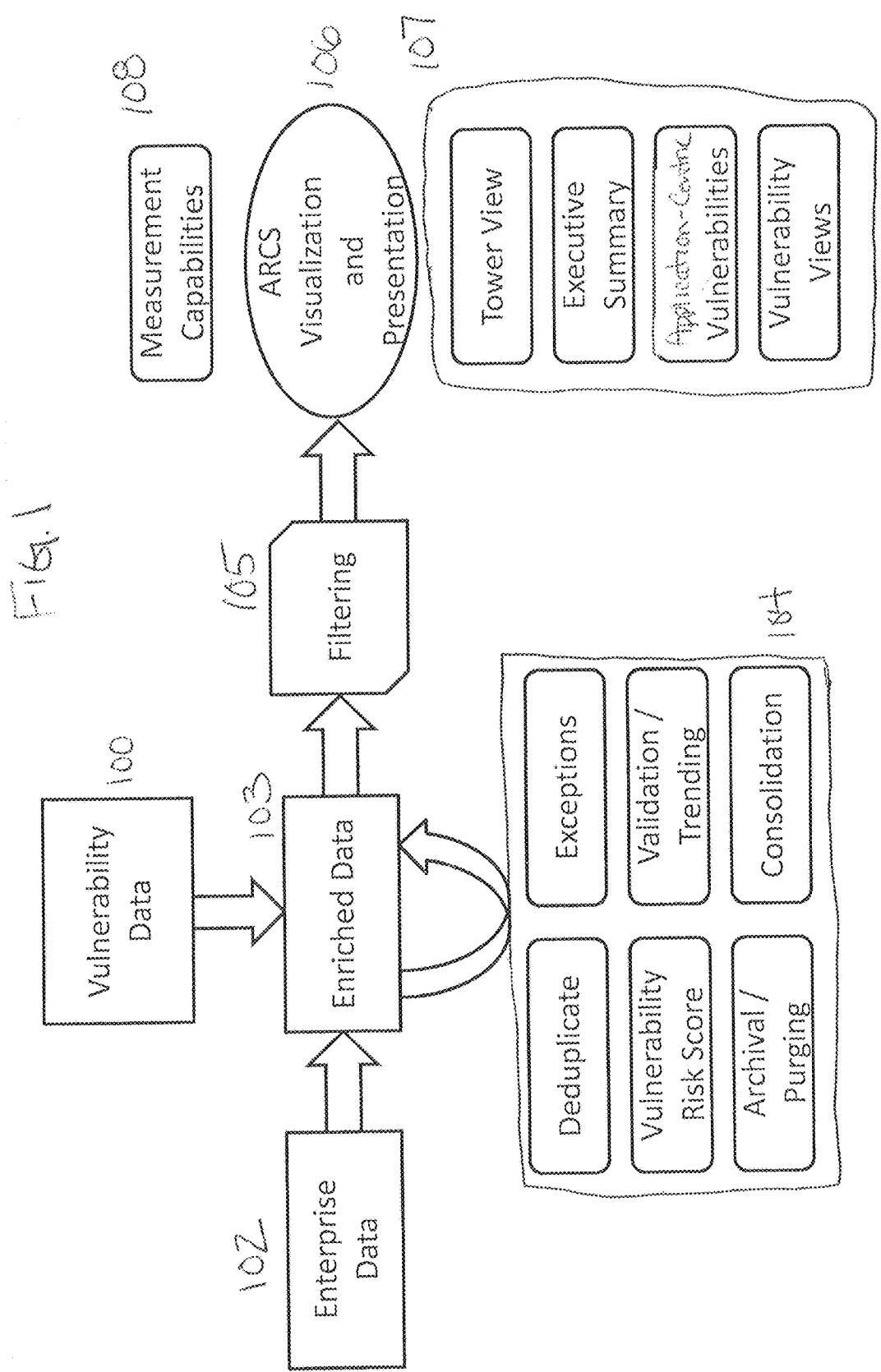
FIG. 1 illustrates an exemplary process of the present invention.

The systems and methods of the present invention enable a reporting tool and process that allow for identifying and responding to vulnerabilities in technology infrastructure environments in a quick and timely manner. It aids in the protection of confidential data by enabling the creation and viewing of actionable reports that may be easily and securely distributed and viewed through controlled access. Visualizations or dashboards provide a current state and future prediction of vulnerability status in the technology infrastructure.

In accordance with the present invention, vulnerability data is consolidated with server, hierarchy, and application data. Thus, it combines data from multiple sources, including, but not limited to, data from vulnerability scanning tools, assets framework scanning (for exploits), server information databases, enterprise frameworks and object-relational mapping frameworks, business intelligence software or tools, and data analytics. Using business logic, the vulnerability data is enriched by combining it with project, server, application, standards, network, and hierarchy data, e.g., by business unit, support unit, application, assignment group, platform, operating system, production/non-production, compliance level, network location, technology office, roll-up, and technology tower. In accordance with this process, the vulnerability data is modeled and enhanced, e.g., based on status or otherwise, through the application of the business logic. Using the vulnerability data and business logic, vulnerability severity (e.g., calculating a vulnerability risk score) may be determined, or recalculated, based on specific rules. The vulnerability may be rated differently depending on the environment in which the vulnerability is located. For example, vulnerabilities identified on externally facing servers may be rated more severe than those that are internal to the network. By way of further example, the vulnerability may be rated less severe if insulated and located behind firewall protections.

A model may be used to interpret vulnerabilities in the environment. As vulnerabilities are detected, they are added to a collection of stored information regarding known vulnerabilities. These vulnerabilities can then be sorted and viewed (also referred to herein as "sliced") in accordance with any of one or more parameters. Slicers enable the determination of the environments (e.g., PRD (Production), Test, DEV (Development)) that are at issue and how long a vulnerability has been within the environment (e.g., 30 days, 60 days, 180 days). Slicers work in combination, which gives the tool the power to sort vulnerabilities, e.g., only vulnerabilities having the highest risk severity score for a single business unit can be shown upon two clicks within the tool.

Thus, the data is easily and quickly sliced/sorted, to provide a clear understanding of the vulnerabilities, e.g., those that are most serious, and to provide a compelling visualization of vulnerabilities by any of one or more parameters that may be defined within the tool. The reporting may also work to match up vulnerabilities data with Service Level Agreements and Service Level Objectives (SLAs/SLOs) for a particular technical environment, so that effective compliance by owners of technical environments that include vulnerabilities can be tracked. It can also be used to inform a user if currency standards for the infrastructure are or are not being met. The systems and methods of the present invention, through their consolidation, enrichment, scoring, and slicing of data, provide an easy mechanism and process to gather metrics and status from a single interface for infrastructure owners and application owners.

Once identified, vulnerabilities can be removed or eliminated by several methods, including server refresh and patching, which may prevent potential security breaches. The systems and methods of the present invention allow for determining the impact of the different correction methods and their change over time. The systems and methods of the present invention can also provide, or enable, a future prediction of vulnerability status in the infrastructure, where the prediction is based, at least in part, on one or more of: the number of active or remaining vulnerabilities, periodic average of vulnerabilities removed or eliminated though patching (e.g., on a rolling month-to-month basis)/patching cadence, and the number of vulnerabilities to be removed or eliminated with a scheduled (or unscheduled) server or other equipment refresh. Bubble charts can be created, which identify where standards across the environment(s) for eliminating vulnerabilities are not being met.

The systems and methods of the present invention, through consolidation, enrichment, scoring, and slicing of data, and tracking and prediction of vulnerability status, provide a mechanism and process to gather metrics and status from a single interface for infrastructure and application owners, and provide infrastructure and application owners with current status metrics and a list of critical vulnerabilities. The metrics may include, but are not limited to, current and historical counts of vulnerabilities, vulnerabilities by severity, technology by patchability, age of open and closed vulnerabilities, vulnerabilities per asset, IPs scanned, incoming and outgoing vulnerabilities, predicted vulnerabilities over time and impact of server refresh and patching.

In accordance with the present invention, the processing efficiency of a computer system or network is increased by consolidating numerous network vulnerabilities, rating the severity of each vulnerability, and facilitating the identification and location of each vulnerability and the unit or group affected by the vulnerability. Information made available through the system can be used to drive changes to software applications to decrease the number of vulnerabilities originating therefrom.

With reference to FIG. 1, an exemplary embodiment of the systems and methods of the present invention is described. A software application scans a subject enterprise network and identifies vulnerability data 100 using a third party scanning appliance. Vulnerability data 100 may include: Status of Scanning (HostVul); First Detected, Last Fixed, Last Scanned, Port, Protocol; Vulnerability Master Data (QID); Description, Threat, Severity, Patchability; Common Vulnerabilities and Exposure Data (CVE); Mapping, URL, Reported Date.

For instance:

| Column | Rec 1 |
| --- | --- |
| ID | 788869 |
| HOSTID | 88988630 |
| IP | 192.168.0.1 |
| NETWORKID | 0 |
| DNS | host1 |
| OS | Linux |
| TRACKING_METHOD | IP |
| LASTSCANDATE | 2016-04-13 05:53:38 |
| QID | 123456 |
| VTYPE | Confirmed |
| FIRST_DETECTED | 2014-10-20 20:06:17 |
| LAST_DETECTED | 2015-08-17 20:05:43 |
| LAST_TESTED | 2016-04-11 20:05:32 |
| LAST_UPDATED | 2016-04-13 05:53:38 |
| LAST_FIXED | 2015-08-24 20:07:11 |
| VULNSTATUS | Fixed |

The vulnerability data 100 may be combined with enterprise-specific data 102 (e.g., enterprise-specific IT data) to create enriched data 103. In one example, data regarding the following may be used to enrich the vulnerability data:

Externally Facing Nodes—(a device that is accessible over the Internet by external entities)

Application Data Protection Systems—(an isolated network area)

Service Level Management—(an application metric for system availability, e.g., Gold/Silver/Bronze)

Organization—(business units/IT group)

Application—(software used to perform business functions, e.g., claims processing)

Server—(properties of the server, e.g., Environment (Prod/Dev/Test); Operating System, Hardware/Software/OS Compliance (Standard/Retired/Contained)

Assignment Groups—(technology units responsible for remediation of vulnerabilities)

Service Level Agreements—(agreed upon response time to remediate vulnerabilities)

Patching/Configuration Data—(plans by assignment groups for remediating vulnerabilities)

Remediation Data—(results of vulnerability resolution efforts)

Server Refresh Data (RFS)—(plans by business units to remove vulnerable devices)

In connection with the enrichment process, enterprise data may be joined with key fields of the vulnerability data in order to leverage existing enterprise data stores to enrich vulnerability reporting. For example, vulnerabilities may be mapped to Internet Protocol (IP) addresses when they are received from the vulnerability scanning system. Using the IP address, the vulnerabilities can be mapped to servers. Servers, in turn, can be mapped to applications. Applications can be mapped to business functions. This is one of several mappings to enterprise-specific data that enriches the data and allows more elaborate correlation and analysis. By way of a further specific example, a DNS identified in a vulnerability scan can be matched to a DNS listing in the data center storage of an enterprise that will associate the scanned DNS with the data center at the enterprise where it resides.

The enriched data may be modified with several enhancing processes 104, including the following, by way of example:

(1) Deduplication—This involves reduction of the number of vulnerabilities seen, eliminating redundant records. Deduplication involves eliminating duplicate records of the same vulnerability on the same server using different ports and protocols. Worst-case parameters on deduplicated records are selected. Thus, for example, there are multiple ports on a server and there are multiple protocols with which a server can be accessed. A vulnerability is considered fixed only if it has been tested non-existent on known combinations of popular ports and protocols. The deduplication process takes the "worst" of the states of the different ports and protocols and reports it as the state of the vulnerability on that server. It also assigns the oldest First Detected dates and the latest Last Fixed dates of the constituent records as the corresponding dates for that vulnerability.

(2) Calculation of Enterprise Vulnerability Risk Score—This involves modification of the severity of vulnerabilities based on enterprise infrastructure factors. For example, a vulnerability detected within a secure enterprise infrastructure reduces severity risk (e.g., Internal Network/Application Data Protection/etc.). Each detected vulnerability may be scored (assigned a Severity) by the scanning appliance and again by the enterprise (i.e., a Risk Score). A vulnerability may have a general severity, but the urgency to fix that vulnerability on a particular server may be less depending on the deployment of the server, e.g. if the server is behind multiple firewalls The final severity score may be adjusted by applying this data.

(3) Archival and Purging of Data—This involves removing of data records that are deemed old or closed. For example, this may involve fixed vulnerabilities that are older than, e.g., 13 months. By way of further example, decommissioned assets with vulnerabilities may be removed after, e.g., 61 days.

(4) Consolidation of IP Addresses into Configuration Items—This involves the use of enterprise discovery data to consolidate vulnerabilities to singular configuration items with multiple IP Addresses. For example, for IP addresses that do not have server names in the data received from the scanning appliance, attempts are made to resolve the names by consulting the enterprise Configuration Management Database.

(5) Exceptions—This involves the automatic modification of data records based on criteria (e.g., lowering of visibility due to active remediation and automatic expiration of exceptions. For example, the due date to fix a vulnerability on a device can be extended temporarily due to extenuating circumstances. This extension may be taken into account while determining due dates and overdue items.

(6) Data Validation (Trending and Traceability)—This involves automatic verification of data and comparison of data across data collections. Data anomalies may be proactively detected. For example, sizes of tables as well as number of records may be automatically compared with the previous week and deviations exceeding, e.g., ±2% cause alerts. When data is processed for each period, trending statistics are automatically generated to facilitate comparison with previous periods.

Figure 2:
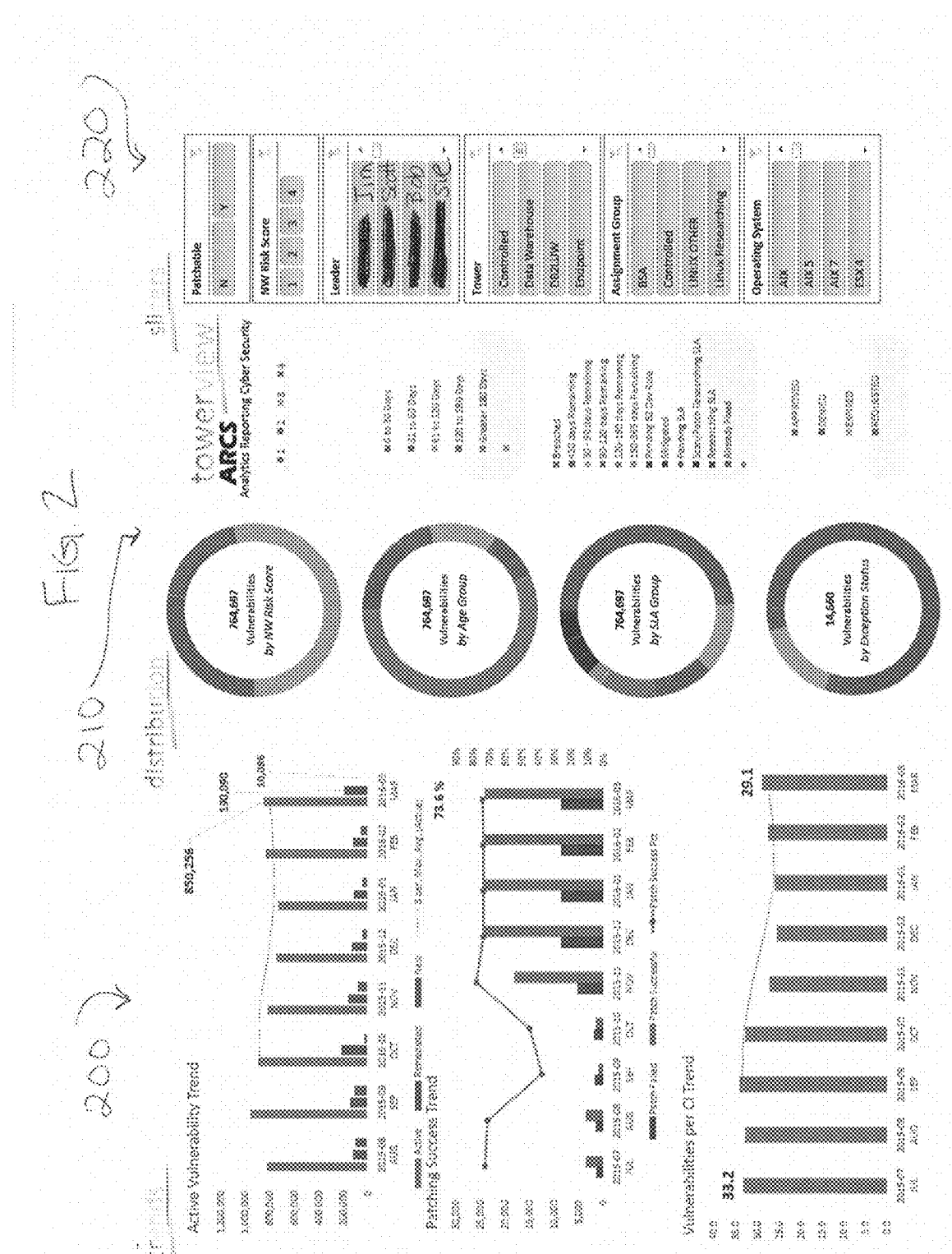
FIG. 2 illustrates a set of exemplary reports that may be generated in accordance with embodiments of the present invention.

The enhanced data may then be filtered 105 (e.g., reduction of enriched data based on various criteria, such as as-of-date, to drive visualization) and displayed 106 in a variety of different ways 107 including, by way of example, views based on technology owner or position within an organization; ad hoc reports; and lists of vulnerabilities. By way of example, FIG. 2 illustrates a set of exemplary report views. In section 200, trends are displayed. In particular, section 200 displays information reflecting trends for active vulnerabilities (i.e., a view by month of active, remediated and newly detected vulnerabilities). Section 210 displays information regarding the total number of vulnerabilities broken down by risk score, age group, and SLA group, as well as exception status. Section 220 shows a Tower view of the data. A Tower refers to an organizational unit within the enterprise responsible for vulnerability remediation and research. Specific, unique business logic may be used to categorize the assignment at the Vulnerability Level. Towers will see their own vulnerabilities and may have their own Service Level Agreements for remediation.

A variety of information technology capabilities 108 are enabled by the tool. For example, the tool allows for effective remediation (e.g., the effect of patching and server refresh on vulnerabilities in the infrastructure). It also allows for active vulnerability trending and forecasting (e.g., using past and future counts of vulnerabilities). The tool may also be used to determine the extent to which an organization is complying with its Service Level Agreement obligations (e.g., determination of vulnerability remediation against time factors). Finally, the tool may be used to determine patching prioritization (e.g., allocation and prioritization of patching resources based on vulnerability categorization).

A variety of benefits are presented by the systems and methods of the present invention. For example, the present invention allows for effective management of vulnerabilities (e.g., the ability to target vulnerabilities in a given order). Further, the present invention allows for a competitive differential in bidding processes (e.g., the ability to show the company's ability to protect customer data in competitive bidding situations). It may also allow for proving compliance with federal regulations relating to, e.g., cyber security.

The one or more computer systems that may be used to implement the methods of the present invention, which methods may be implemented as programmable code for execution by a computer system, are now described. More particularly, each of the computer systems comprises hardware, as described more fully herein, that is used in connection with executing software/computer programming code (i.e., computer readable instructions) to carry out the steps of the methods described herein. Use of a computer system in accordance with the present invention allows end users to break down the vulnerability data to a level that is consistent across an organization. For example, there may be a centralized repository of vulnerability data, allowing for consistent reporting across all views. The use of a computer provides an efficient way to display visualization across multiple users. The backend merging and calculations carried out by the computer allow for this to occur. Without the use of a computer, an inconsistent number of vulnerabilities would result and there would not be time to analyze the amount of data necessary in order to patch the vulnerability within the organization's given SLAs. For example, if each technology tower decided on when the clock starts to apply the SLA to fix a Vulnerability, then there would be different conclusions of due dates for the fix. By centralizing the due date calculation logic, uniformity is achieved.

The various computer systems used in connection with the present invention include those that are under analysis (i.e., those in which vulnerabilities are detected); that are involved in detecting vulnerabilities; from which enriched data is obtained; that are involved in the enhancing process; and that are involved in the slicing and display process. These systems are described with reference to FIG. 3.

Each computer system 300 includes one or more processors 301. The processor 301 may be any type of processor, including but not limited to a special purpose or a general-purpose digital signal processor, specially programmed to perform the methods described herein. The processor 301 may be connected to a communication infrastructure 306 (e.g. a data bus or computer network) either via a wired connection or a wireless connection. The communication infrastructure 306 carries signals and may be implemented using wire or cable, fiber optics, a phone line, a wireless link, a cellular phone link, a radio frequency link, or any other suitable communication channel, including a combination of the foregoing exemplary channels.

The computer system includes one or more memories 302, 303. The memory 302 may include at least one of: random access memory (RAM), a hard disk drive and a removable storage drive, such as a floppy disk drive, a magnetic tape drive, or an optical disk drive. The removable storage drive reads from and/or writes to a removable storage unit. The removable storage unit can be a floppy disk, a magnetic tape, an optical disk, which is read by and written to a removable storage drive.

In alternative implementations, the memory 303 may include other similar means for allowing computer programs or other instructions to be loaded into computer system. Such means may include, for example, a removable storage unit and an interface. Examples of such means may include a removable memory chip (such as an EPROM, or PROM, or flash memory) and associated socket, and other removable storage units and interfaces which allow software and data to be transferred from removable storage unit to the computer system. Alternatively, the program may be executed and/or the data accessed from the removable storage unit, using the processor of the computer system.

The computer system includes one or more user interfaces. The user interface may be a program that controls a display of computer system, on which the output of the processes described herein can be displayed. The user interface may include one or more peripheral user interface components, such as a keyboard or a mouse. The end user may use the peripheral user interface components to interact with computer system. The user interface may receive user inputs, such as mouse inputs or keyboard inputs from the mouse or keyboard user interface components.

In some embodiments, the user interface displays data on the display of a computer system using a web browser. A web browser may be an application with the ability to render HTML pages, Cascading Style Sheets (CSS) and JavaScript content on the display of the user interface. In some embodiments, the user interface displays data, such as web pages, on the display of the client device using another software application. One of ordinary skill in the art will appreciate that the user interface is not limited to displaying data using a web browser or another software application, and that embodiments of the present invention may contemplate using other display devices or software suitable for the purposes of displaying the data.

The computer system may also include a communication interface 304. The communication interface 304 allows software and data to be transferred between the computer system and an external device. Examples of the communication interface 304 may include a modem, a network interface (such as an Ethernet card), and a communication port, by way of example. Software and data transferred via the communication interface are in the form of signals, which may be electronic, electromagnetic, optical, or other signals capable of being received by the communication interface. These signals are provided to the communication interface 304 via a communication infrastructure 306.

Thus, in exemplary embodiments, there is included one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

It will be appreciated by those skilled in the art that changes could be made to the exemplary embodiments shown and described above without departing from the broad inventive concept thereof. It is understood, therefore, that this invention is not limited to the exemplary embodiments shown and described.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

What is claimed is:

1. A computer implemented method carried out using a computer processor, the method comprising:

receiving, via a scanning appliance, data describing a plurality of vulnerabilities detected on a server;

combining data, via the computer processor, regarding an identity of the server, data regarding one or more applications associated with the server, and data regarding one or more business functions associated with one or more of the one or more applications with the data describing the plurality of vulnerabilities detected on the server;

identifying, via the computer processor, duplicative vulnerability data within the combined data, the duplicative vulnerability data comprising one or both of (i) data representative of a same vulnerability associated with multiple ports on the server and (ii) data representative of a same vulnerability associated with multiple access protocols on the server;

assigning, via the computer processor, as a state of vulnerability on the server a state associated with a most severe vulnerability within the duplicative vulnerability data of the combined data;

sorting, via the computer processor, the combined data using one or more filters; and displaying, via a communication interface, the sorted data; and remediating the vulnerability by one or more of i) an equipment refresh and ii) patching.

2. A system comprising: memory operable to store at least one program; and at least one processor communicatively coupled to the memory, in which the program, when executed by the at least one processor, causes the at least one processor to perform a method comprising:

receiving, via a scanning appliance, data describing a plurality of vulnerabilities detected on a server;

combining data, via the processor, regarding an identity of the server, data regarding one or more applications associated with the server, and data regarding one or more business functions associated with one or more of the one or more applications with the data describing the plurality of vulnerabilities detected on the server;

identifying, via the processor, duplicative vulnerability data within the combined data, the duplicative vulnerability data comprising one or both of (i) data representative of a same vulnerability associated with multiple ports on the server and (ii) data representative of a same vulnerability associated with multiple access protocols on the server;

assigning, via the processor, as a state of vulnerability on the server a state associated with a most severe vulnerability within the duplicative vulnerability data of the combined data;

sorting, via the processor, the combined data using one or more filters; and displaying, via a communication interface, the sorted data; and remediating the vulnerability by one or more of i) an equipment refresh and ii) patching.

3. A non-transitory computer readable medium storing instructions which, when executed by a computer processor, cause the computer processor to perform a method comprising:

receiving, via a scanning appliance, data describing a plurality of vulnerabilities detected on a server;

combining data, via the computer processor, regarding an identity of the server, data regarding one or more applications associated with the server, and data regarding one or more business functions associated with one or more of the one or more applications with the data describing the plurality of vulnerabilities detected on the server;

identifying, via the computer processor, duplicative vulnerability data within the combined data, the duplicative vulnerability data comprising one or both of (i) data representative of a same vulnerability associated with multiple ports on the server and (ii) data representative of a same vulnerability associated with multiple access protocols on the server;

assigning, via the computer processor, as a state of vulnerability on the server a state associated with a most severe vulnerability within the duplicative vulnerability data of the combined data;

sorting, via the computer processor, the combined data using one or more filters; and displaying, via a communication interface, the sorted data; and remediating the vulnerability by one or more of i) an equipment refresh and ii) patching.

4. The method of claim 1, wherein the remediating includes removing or eliminating the vulnerabilities.

5. The method of claim 1, wherein the remediating includes removing the vulnerabilities.

6. The method of claim 1, wherein the remediating includes eliminating the vulnerabilities.

7. The system of claim 2, wherein the remediating includes removing or eliminating the vulnerabilities.

8. The system of claim 2, wherein the remediating includes removing the vulnerabilities.

9. The system of claim 2, wherein the remediating includes eliminating the vulnerabilities.

10. The non-transitory computer readable medium of claim 3, wherein the remediating includes removing or eliminating the vulnerabilities.

11. The non-transitory computer readable medium of claim 3, wherein the remediating includes removing the vulnerabilities.

12. The non-transitory computer readable medium of claim 3, wherein the remediating includes eliminating the vulnerabilities.

* * * * *